(12) United States Patent
Schrenk

(10) Patent No.: US 10,985,842 B2
(45) Date of Patent: Apr. 20, 2021

(54) METHOD FOR RECEIVING A MODULATED OPTICAL SIGNAL AND RECEIVER UNIT

(71) Applicant: AIT AUSTRIAN INSTITUTE OF TECHNOLOGY GMBH, Vienna (AT)

(72) Inventor: Bernhard Schrenk, Ulrichskirchen (AT)

(73) Assignee: AIT Austrian Institute of Technology GmbH, Vienna (AT)

( * ) Notice: Subject to any disclaimer, the term of this patent is extended or adjusted under 35 U.S.C. 154(b) by 0 days.

(21) Appl. No.: 16/759,809

(22) PCT Filed: Jul. 6, 2018

(86) PCT No.: PCT/AT2018/060137
§ 371 (c)(1),
(2) Date: Jul. 2, 2020

(87) PCT Pub. No.: WO2019/014694
PCT Pub. Date: Jan. 24, 2019

(65) Prior Publication Data
US 2020/0343977 A1    Oct. 29, 2020

(30) Foreign Application Priority Data
Jul. 20, 2017   (AT) .............................. A 50606/2017

(51) Int. Cl.
| | |
|---|---|
| *H04B 10/50* | (2013.01) |
| *H04B 10/40* | (2013.01) |
| *H04B 10/61* | (2013.01) |
| *H04B 10/63* | (2013.01) |
| *H04B 10/572* | (2013.01) |
| *H04L 27/20* | (2006.01) |
| *H04B 10/2575* | (2013.01) |

(52) U.S. Cl.
CPC ..... *H04B 10/505* (2013.01); *H04B 10/25752* (2013.01); *H04B 10/40* (2013.01);
(Continued)

(58) Field of Classification Search
None
See application file for complete search history.

(56) References Cited

U.S. PATENT DOCUMENTS

| 5,946,438 A | * | 8/1999 | Minot | .................... H04B 10/40 |
| | | | | 257/80 |
| 7,269,312 B2 | * | 9/2007 | Ng | .................... G02B 6/12019 |
| | | | | 385/24 |

(Continued)

FOREIGN PATENT DOCUMENTS

| EP | 0872968 A2 | * | 10/1998 | ............. H04B 10/43 |
| EP | 0872968 A2 | | 10/1998 | |

OTHER PUBLICATIONS

Andreas Stoehr et al.: "Full-Duplex Fiber-Optic RF Subcarrier Transmission Using a 1-19 Dual-Function Modulator/Photodetector", IEEE Transactions on Microwave Theory and Techniques, Plenum, USA, vol. 47, No. 7, Jul. 1, 1999 (Jul. 1, 1999), ISSN: 0018-9480, XP011037660.

(Continued)

*Primary Examiner* — Li Liu
(74) *Attorney, Agent, or Firm* — Laurence A. Greenberg; Werner H. Stemer; Ralph E. Locher

(57) ABSTRACT

A method for receiving a modulated receive signal, with a transmission unit having a laser and an electro-absorption modulator. The received optical receive signal is directed towards the laser; due to the irradiance of the optical receive signal onto the laser, the optical frequency of the light radiated from the laser is adapted to and/or aligned with the optical frequency of the received optical receive signal; the light radiated from the laser and the optical receive signal received via the optical waveguide are overlapped in the electro-absorption modulator; the thus-created overlapping signal from the electro-absorption modulator is converted into an electrical receive signal, in particular into an elec- (Continued)

trical current signal; and a receive signal is provided which corresponds to the electrical receive signal or is derived from same.

20 Claims, 8 Drawing Sheets

(52) U.S. Cl.
CPC ......... *H04B 10/506* (2013.01); *H04B 10/572* (2013.01); *H04B 10/615* (2013.01); *H04B 10/63* (2013.01); *H04L 27/2096* (2013.01)

(56) References Cited

U.S. PATENT DOCUMENTS

2007/0091941 A1* 4/2007 Mori .................. H01S 3/06754
372/18
2011/0091214 A1* 4/2011 Cheng ................ H04J 14/0282
398/91
2020/0343978 A1* 10/2020 Schrenk ................ H04L 7/0075

OTHER PUBLICATIONS

C. Boerner et al.: "160 Gbit/s clock recovery with electro-optical PLL using bidirectionally operated electroabsorption modulator as phase comparator", Electronics Letters, GB, vol. 39, No. 14, Jan. 1, 2003 (Jan. 1, 2003), p. 1071, DOI: 10.1049/el:20030674, ISSN: 0013-5194, XP055505697.

Bernhard Schrenk: "Injection-Locked Coherent Reception Through an Externally Modulated Laser", IEEE Journal of Selected Topics in Quantum Electronics, US, vol. 24, No. 2, Mar. 1, 2018 (Mar. 1, 2018), pp. 1-7, DOI: 10.1109/JSTQE.2017.2776518, ISSN: 1077-260X, XP055505696.

Bernhard Schrenk: "The EML as Coherent Optical Receiver", 2017 European Conference on Optical Communication (ECOC), IEEE, Sep. 17, 2017 (Sep. 17, 2017), pp. 1-3, DOI: 10.1109/ECOC.2017. 8345953 XP033336279.

* cited by examiner

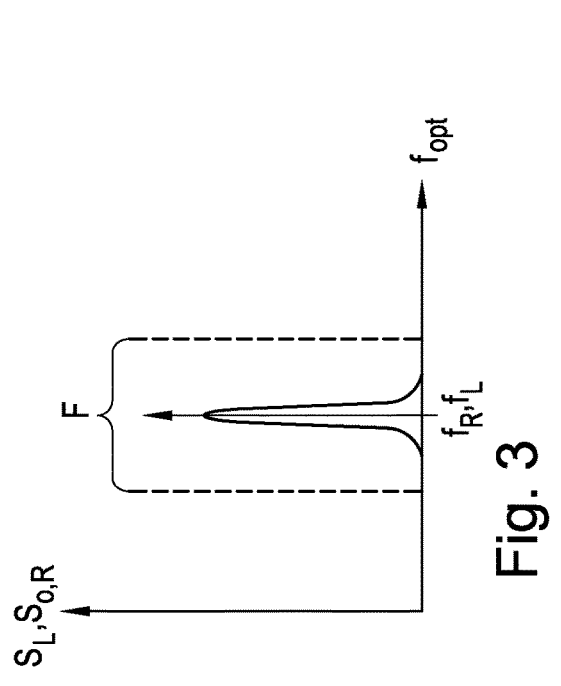
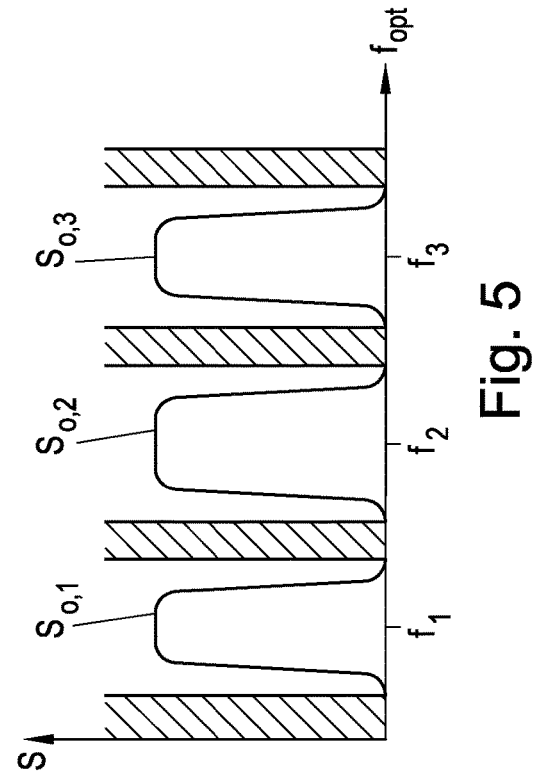
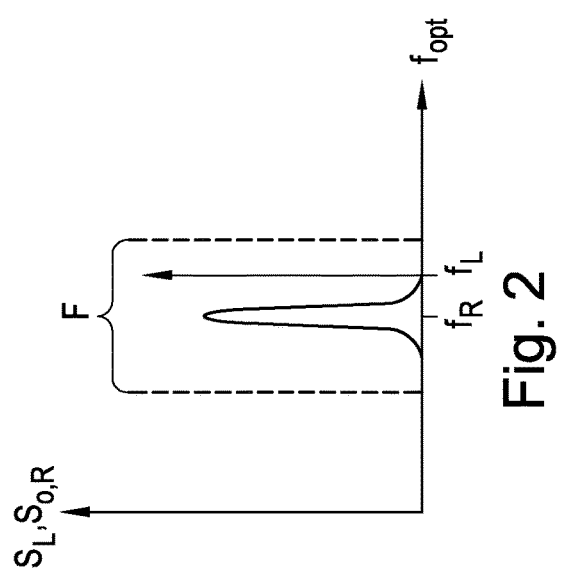
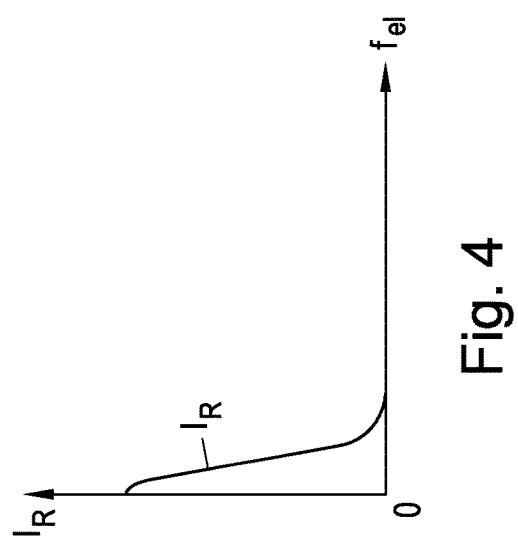

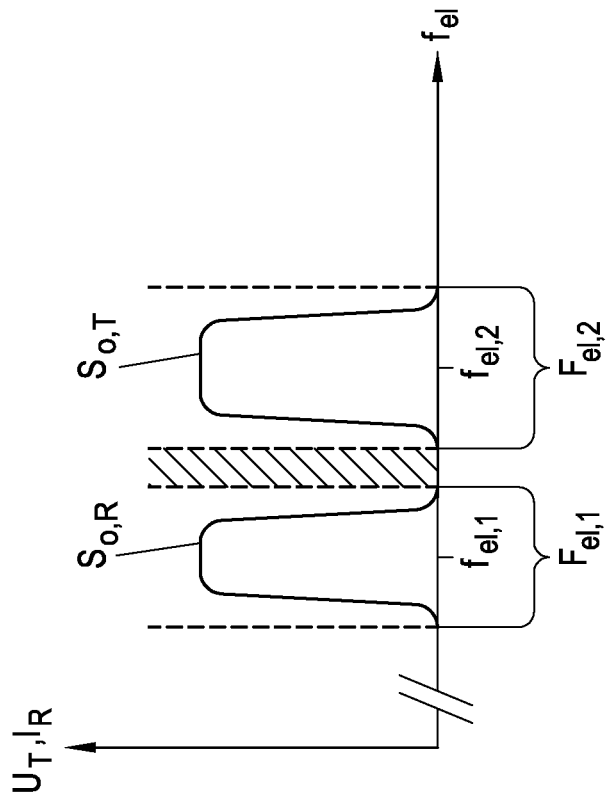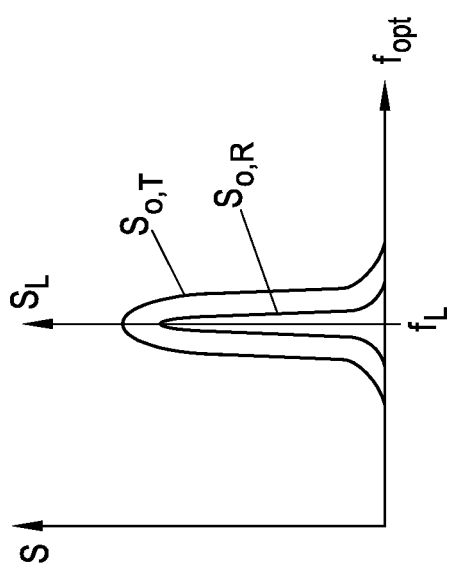

METHOD FOR RECEIVING A MODULATED OPTICAL SIGNAL AND RECEIVER UNIT

BACKGROUND OF THE INVENTION

Field of the Invention

The invention relates to a method for receiving a modulated optical signal, in particular an amplitude-modulated, optical reception signal preferably generated through the modulation of light of a laser, with a transmission unit comprising a laser with an electrical input for control of the laser current and of the frequency of the light output by the laser, wherein the laser comprises an optical laser output, and an electro-absorption modulator following the optical laser output that comprises an electrical modulation terminal. The laser is directed at the electro-absorption modulator, and the light of the laser is guided through the electro-absorption modulator and coupled into an optical waveguide at an optical terminal of the electro-absorption modulator. The invention further relates to a transmission unit that is in particular suitable for carrying out a method according to the invention. The invention furthermore relates to a central node and an antenna node as claimed. The invention finally also relates to a data transmission network as claimed and to a data transmission network as claimed.

Devices for transmitting data or signals comprising a laser on the one hand and an electro-absorption modulator on the other hand are known from the prior art. The light transmitted from the laser here is attenuated by the electro-absorption modulator, so that the light at the output of the electro-absorption modulator is present in modulated form, and can be coupled into a data network via an optical waveguide.

SUMMARY OF THE INVENTION

The first object is, in the case of such a configuration, to provide for the possibility of transmitting or receiving data or signals with the same transmission unit.

The invention relates to a method for receiving a modulated, in particular an amplitude-modulated, optical reception signal preferably generated through the modulation of light, with a transmission unit comprising a laser with an electrical input for control of the laser current and of the frequency of the light output by the laser, wherein the laser comprises an optical laser output, and an electro-absorption modulator following the optical laser output that comprises an electrical modulation terminal, wherein the laser is directed at the electro-absorption modulator, and the light of the laser is guided through the electro-absorption modulator and coupled into an optical waveguide at an optical terminal of the electro-absorption modulator.

It is provided according to the invention that in a method for receiving such an optical reception signal, the received optical reception signal, having an optical frequency within a specified optical frequency range, is directed via the optical waveguide through the electro-absorption modulator onto the laser, the laser is preset through the drive of the electrical input to a specified optical frequency that lies within an optical frequency range that in particular is within +/−1 GHz around the optical frequency of the received optical reception signal, as a result of the irradiation of the optical reception signal onto the laser, the optical frequency of the light radiated by the laser adapts to the optical frequency of the received optical reception signal and/or is adjusted to it, the light radiated by the laser and the optical reception signal received via the optical waveguide are overlaid in the electro-absorption modulator, that the overlay signal generated in that way is converted by the electro-absorption modulator into an electrical reception signal, in particular into an electrical current signal that preferably corresponds to the current curve at the electrical modulation terminal of the electro-absorption modulator, and a reception signal is made available that corresponds to the electrical reception signal or is derived from it, and is retained at a signal terminal, in particular as a current or voltage signal.

The invention also relates to a method for receiving a modulated reception signal with a transmission unit comprising a laser and an electro-absorption modulator. The invention provides that the received optical reception signal is directed onto the laser, that as a result of the irradiation of the optical reception signal onto the laser, the optical frequency of the light radiated by the laser adapts to the optical frequency of the received optical reception signal and/or is adjusted to it, that the light radiated by the laser and the optical reception signal received via the optical waveguide are overlaid in the electro-absorption modulator, that the overlay signal generated in that way is converted by the electro-absorption modulator into an electrical reception signal, in particular into an electrical current signal, and that a reception signal is made available that corresponds to the electrical reception signal or is derived from it.

This measure makes it possible to operate a combination of a laser and an electro-absorption modulator, known per se, for the reception of optical signals in a simple manner.

Furthermore, for the simultaneous transmission and reception of data, in particular in duplex operating mode, it can be provided a) that a transmission signal to be transmitted is made available as an electrical transmission signal, in particular as an electrical voltage signal, b) that the electrical transmission signal is applied as a voltage signal to the modulation terminal of the electro-absorption modulator during the reception according to the invention, and an optical transmission signal produced in that way through modulation of the light generated by the laser is coupled into the optical waveguide, c) that the current drawn by the electro-absorption modulator is ascertained and in that way a current signal is generated that is drawn by the electro-absorption modulator when this electrical transmission signal is specified, d) that on the basis of specified criteria, the temporal current curve is modelled that, in the presence of a specified irradiation of the electro-absorption modulator by the light of the laser and a specified signal application with the electrical transmission signal at the electrical modulation terminal of the electro-absorption modulator, when no optical reception signal is received via the optical waveguide or when an optical reception signal is received that does not contain a modulated signal, and this current curve is retained as the modelled current curve, e) that the difference between the current curve measured in step c) and the current curve modelled in step d) is formed, and f) that this difference is assumed to result from the optical reception signal and is provided as the reception signal.

A preferred form of embodiment that takes account of the changing propagation properties of light waves in the optical waveguide, in particular of the polarization behavior of the optical waveguide varying over time, provides that the light of the laser is additionally directed to a further electro-absorption modulator, that the optical terminals of the two electro-absorption modulators are each connected to one of the two polarization inputs of a polarization beam splitter, and the output of the polarization beam splitter is coupled to the optical waveguide, that an electrical reception signal is ascertained by each of the two electro-absorption modulators, wherein the electrical reception signal with the higher signal strength is retained as the reception signal.

One preferred form of embodiment of the invention, which in such a case enables a duplex operation in a simple manner, provides that whichever electro-absorption modulator at which the respectively weaker electrical reception signal is ascertained is employed for the transmission of the optical transmission signal, wherein in particular the transmission signal to be transmitted, preferably in the form of an electrical voltage signal, is applied to the modulation terminal of the respective electro-absorption modulator at which the respectively weaker electrical reception signal is ascertained.

A further advantageous form of embodiment of the invention that enables a duplex operation in time-multiplex mode provides that to generate a modulated optical reception signal, light with a specified optical frequency is modulated with a signal to be transmitted, and wherein, in alternating sequential time segments signals are received according to a method according to the invention, wherein the optical frequency of the laser is adjusted to the specified optical frequency, and subsequently, in the respectively following time segment, light with the same specified optical frequency is output by the laser onto the electro-absorption modulator, and a transmission signal that is to be transmitted, in particular in the form of an electrical voltage signal, is specified at the electrical modulation terminal of the electro-absorption modulator, so that the light passing through the electro-absorption modulator is attenuated in accordance with the transmission signal to be transmitted, and the optical transmission signal obtained in that way is coupled into the optical waveguide and transmitted.

A further advantageous form of embodiment of the invention, that enables a duplex operation in frequency-multiplex mode, provides that to generate the reception signal, a data signal is modulated with a specified first electrical frequency, so that it has frequency components within a first frequency range around the specified electrical frequency, and the signal obtained in that way is subsequently used for the modulation of light with a specified optical frequency and that a modulated optical reception signal is obtained in that way, that this reception signal is obtained in accordance with a method according to the invention making use of light having the specified optical frequency, and an electrical reception signal is obtained in that way that comprises frequency components within a specified first electrical frequency range, and at the same time, an electrical transmission signal that comprises signal components within an electrical frequency band different from the first frequency band and not overlapping with it, preferably spaced apart from it, is applied to the electro-absorption modulator, and light with the specified optical frequency is output by means of the laser to the electro-absorption modulator, so that the light passing through the electro-absorption modulator is attenuated corresponding to the transmission signal to be transmitted, and the optical transmission signal obtained in that way is coupled into the optical waveguide and transmitted.

One particularly advantageous type of operation of a mobile radio network for the transmission of signals from a central node to an antenna node provides that a data signal, in particular one received previously over a data network, is provided in the central node and is then modulated with at least one frequency specified by an oscillator and that a modulated electrical signal is generated in that way, wherein a modulated optical signal is provided by means of a central transmission unit on the basis of the modulated electrical signal, and is coupled into the optical waveguide and transmitted to one of the antenna nodes, wherein on the basis of the optical signal generated in this way in the antenna node according to one of the preceding claims a reception signal is ascertained by means of an antenna-side transmission unit, and is provided at the signal terminal of the antenna-side transmission unit, and wherein the reception signal, amplified if appropriate, preferably in the form of a current or voltage signal, is transmitted to the antenna of the antenna node and radiated out from this.

The primary advantage of this method is that it is not necessary for oscillators for the transposition or frequency conversion of the received signals or any digital-to-analog converters to be present in the individual antenna nodes, since signals are transmitted in optical, modulated form between the antenna nodes and the central node.

Particularly preferably it can be provided for the transmission of signals from mobile terminals via an antenna node and a central node into a data network that modulated, electromagnetic signals, in particular mobile radio signals, entering from the antenna of the antenna node are received and, amplified if appropriate, forwarded to the signal terminal of the antenna-side transmission unit of the antenna node, and from the antenna-side transmission unit an optical signal is generated as claimed in one of the preceding claims and transmitted via the optical waveguide to the central node, that this optical signal is received in the central node and, in particular in accordance with a method according to the invention, converted by means of the central transmission unit into an electrical signal, that this electrical signal is demodulated making use of a frequency specified by the oscillator and that the data signal, demodulated in this way, is retained in the central node and, if appropriate, transmitted on via the data network.

Also provided according to the invention in a transmission unit for receiving an optical reception signal are a laser with an electrical input and an optical laser output, at least one electro-absorption modulator following the optical laser output of the laser with an electrical modulation terminal and an optical terminal for optically coupling the electro-absorption modulator to an optical waveguide, wherein the laser is directed onto the optical terminal of the electro-absorption modulator and positioned in such a way that the light of the laser emerges from the electro-absorption modulator at the optical terminal, and that light arriving at the electro-absorption modulator from the optical terminal is directed at the laser, wherein the electro-absorption modulator is designed to overlay light radiated by the laser and an optical reception signal entering at the optical terminal, and to retain an electrical reception signal at its electrical modulation terminal that corresponds to an overlay signal of the light radiated by the laser and the optical reception signal, and a control unit connected to the electrical input of the laser and the electrical modulation terminal of the electro-absorption modulator, with an electrical signal terminal, wherein the control unit is designed to specify the laser current and the frequency of the light output by the laser via the electrical input of the laser to a value within an optical frequency range that lies in particular in the region from +/−1 GHz around the wavelength of the light carried in the optical waveguide, or around the optical frequency of the received optical reception signal, and to analyze the electrical reception signal at the electrical modulation terminal of the electro-absorption modulator and in that way to retain a reception signal corresponding to the optical reception signal entering at the optical terminal.

Such a transmission unit makes it possible, with a simple construction using components that are known per se, for the transmission of optical signals to generate a transmission unit that is also capable of receiving optical signals.

Furthermore, for the simultaneous transmission and reception of data, in particular in duplex operating mode, it can be provided that the control unit is further designed to generate, on the basis of the transmission signal to be transmitted applied to its signal terminal, as an electrical transmission signal during the reception of signals to apply to the modulation terminal of the electro-absorption modulator, to ascertain the current drawn by the electro-absorption modulator and in that way to generate a current signal, on the basis of specified criteria, to model the temporal current curve that, in the presence of a specified irradiation of the electro-absorption modulator by the light of the laser and a specified signal application at the electrical modulation terminal of the electro-absorption modulator, when no optical reception signal enters via the optical waveguide or when an optical reception signal enters that does not contain a modulated signal, and to retain this current curve as the modelled current curve, to form the difference between the measured current curve and the modelled current curve, and to make this difference, or a signal curve derived therefrom, available as a reception signal.

A preferred form of embodiment that takes account of the changing propagation properties of light waves in the optical waveguide, in particular of the polarization behavior of the optical waveguide varying over time, provides that a further electro-absorption modulator is provided to which the light of the laser is directed, that the optical terminals of the two electro-absorption modulators are each connected to one of the two polarization inputs of a polarization beam splitter, and the output of the polarization beam splitter is coupled to the optical waveguide, that both electro-absorption modulators are designed to ascertain an electrical reception signal at their electrical modulation terminal, and that the control unit is designed to retain whichever electrical reception signal has the higher signal strength at its signal terminal as the reception signal.

One preferred form of embodiment of the invention, which in such a case enables a duplex operation in a simple manner, provides that the control unit is designed to select whichever electro-absorption modulator at which the respectively weaker electrical reception signal has been ascertained for the transmission of the optical transmission signal, wherein the transmission signal to be transmitted, in particular in the form of an electrical voltage signal, is applied to the modulation terminal of the respective electro-absorption modulator at which the respectively weaker electrical reception signal has been ascertained.

A preferred central node with which it is possible within a mobile radio network to transmit optical signals in such a way that they do not have to be modulated in the antenna nodes and therefore no oscillator or frequency converter, and also no digital-to-analog converter, has to be present in the antenna nodes, provides:

a data relaying unit with at least one data terminal for connection to a data network, at least one modulation terminal and at least one frequency input, an oscillator connected to the frequency input, wherein the oscillator is designed to generate frequency signals in accordance with specified criteria and for the transmission of the frequency signals to the frequency input, and at least one central transmission unit in accordance with the invention, wherein the signal terminal of the central transmission unit is connected to a modulation terminal of the data relaying unit and an optical waveguide is coupled into the optical terminal of the central transmission unit, wherein the data relaying unit is designed to modulate a data signal entering via the data network at the data terminal onto at least one frequency signal transmitted by the oscillator at the frequency input according to a specified modulation method, and to make it available as a modulated transmission signal at the modulation terminal and, in accordance with specified criteria, to transmit it to the corresponding central transmission unit and to demodulate a reception signal entering via the modulation terminal from the central transmission unit in accordance with a specified demodulation method by means of a frequency signal specified by the oscillator, and to make this available as a demodulated data signal at the first electrical data terminal and to forward it to the data network.

For the transmission of signals from the advantageous central node to one of the antenna nodes it can particularly preferably be provided that the central transmission unit is preferably designed to generate light by means of a laser and to direct it at an electro-absorption modulator, and in that way to provide a transmission signal entering at the signal terminal of the central transmission unit from the data relaying unit as a modulated optical transmission signal at the optical terminal, to couple it into the optical waveguide and in particular to transmit it to an antenna node, and to make an optical reception signal, in particular entering from an antenna node via the optical waveguide at the optical terminal, available as a reception signal at the signal terminal and transmit it to the data relaying unit.

An antenna node for the wireless transmission of data to a mobile radio device with an antenna which is able to further process optical signals in a simple manner and which in particular does not need its own oscillator, frequency converter or digital-to-analog converter, provides:

a mobile radio antenna, wherein the mobile radio antenna is designed to enter into radio connection with the mobile radio device, at least one antenna-side transmission unit in accordance with the invention, whose signal terminal is connected to the antenna, and an optical waveguide connected to the optical terminal of the antenna-side transmission unit.

It can in particular be provided here that the antenna-side transmission unit is in particular designed to generate light by means of a laser and to direct it to an electro-absorption modulator, and in that way to provide a signal entering at its signal terminal from the amplifier as a modulated optical signal at the optical terminal, to couple it into the optical waveguide and in particular to transmit it to a central node, and to make an optical signal, in particular entering from a central node via the optical waveguide at the optical terminal, available as a transmission signal at the signal terminal and transmit it to the mobile radio antenna via the bidirectional amplifier.

To amplify the signals before the signal transmission, it can be provided that the antenna node comprises a bidirectional amplifier connected at the mobile radio antenna, that is connected to the signal terminal of the antenna-side transmission unit, and that is designed
  to amplify the data collected from the mobile radio antenna and to forward it as an electrical reception signal to the signal terminal of the antenna-side transmission unit, and
  to amplify signals provided by the antenna-side transmission unit at its and forward them for transmission to the mobile radio antenna.

A data transmission network that is connected to the antenna nodes with a central node explained above, and wherein the necessity of a separate oscillator, frequency converter or digital-to-analog converter being present in the individual antenna nodes is absent, provides:

a central node according to the invention and
a large number of antenna nodes according to the invention,
wherein the optical terminal of the antenna-side transmission unit of the antenna node and the optical terminal of the central transmission units of the central node are each connected to one another via a respective optical waveguide, and wherein preferably at least one mobile radio device in radio connection with the mobile radio antenna.

A data exchange network with which a large number of transmission units according to the invention can be put into data communication with one another in an easy manner, provides:

a central interface with terminals and
a large number of transmission units according to the invention, wherein the respective optical terminal of the individual transmission units is each connected to a terminal of the interface by means of an optical waveguide,
wherein the interface is designed to distribute optical signals entering it via one of the optical waveguides and forward them to the other transmission units,
wherein at least one transmitting and receiving frequency is assigned to each transmission unit, and wherein the transmission units assigned to each of the transmission and reception frequencies are stored in the respective control unit of each of the transmission units, and
wherein the control units of the transmission units are designed, in the event of data transmission, to set, through drive of the respective electrical input, their laser to an optical frequency that is located in an optical frequency range that is in particular +/−1 GHz around the optical frequency of the transmission unit selected for the reception.

BRIEF DESCRIPTION OF THE SEVERAL VIEWS OF THE DRAWING

FIG. 2 shows a spectral frequency diagram of the light of the laser in the optical domain with an optical signal to be received modulated thereon in the initial situation.

FIG. 3 shows a spectral frequency diagram of the light of the laser as well as that of the optical signal to be received in the optical domain after the adjustment of the laser frequency through injection locking.

FIG. 4 shows a frequency diagram of the electrical baseband reception signal in the electrical domain after the adjustment of the laser frequency $f_L$ to $f_R$ through injection locking.

FIG. 5 shows a frequency diagram in the optical domain when a plurality of optical signal frequencies are used.

FIG. 5a and FIG. 5b show the optical and electrical signals arising in an advantageous form of embodiment of the invention making use of frequency multiplexing.

DETAILED DESCRIPTION OF THE INVENTION

Figure 1:
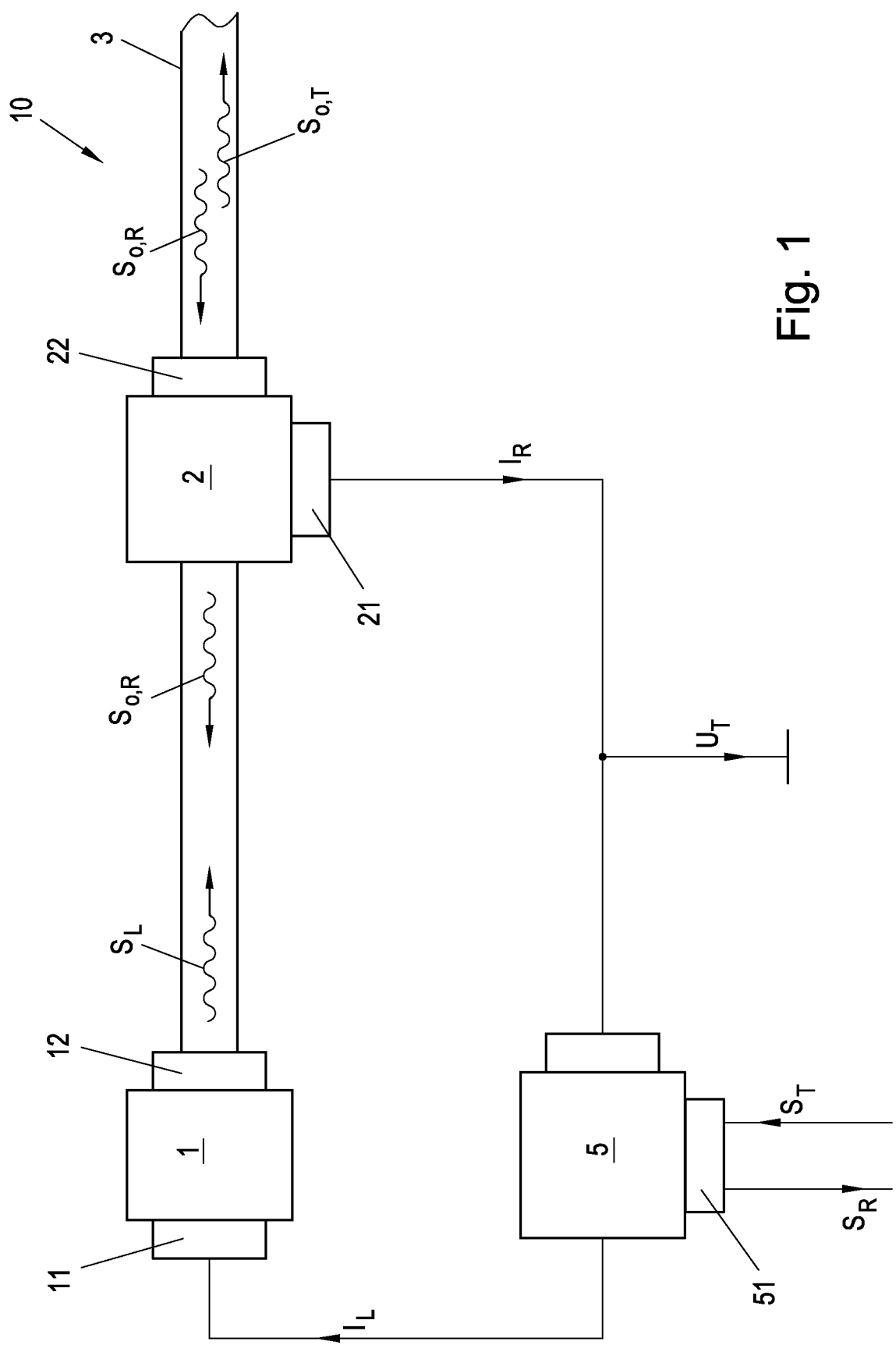
FIG. 1 shows a first form of embodiment of a transmission unit 10 according to the invention.

The transmission unit illustrated in FIG. 1 according to a first form of embodiment of the invention comprises a laser 1 that comprises an electrical input 11 with which the laser current $I_L$ used in the generation of the light $S_L$ can be regulated. Through the specification of the laser current $I_L$ the wavelength or frequency of the light $S_L$ output by the laser 1 can be stipulated.

The frequency of the light $S_L$ output by the laser 1 also depends on the temperature of the laser 1. This circumstance can be used to specify approximately the frequency of the light $S_L$. Fine control of the frequency of the light $S_L$ can be performed through variation of the laser current $I_L$. The laser 1 can, in addition, be temperature-stabilized, whereby the influences of variations of the temperature on the frequency of the light $S_L$ can be avoided. The laser 1 further comprises an optical laser output 12, from which the light $S_L$ produced by the laser 1 is radiated.

Electro-absorption modulators like the electro-absorption modulator 2 illustrated in FIG. 1 are known from the prior art, for example from the following publication: T. Ido et al., IEEE Phot. Tech. Lett., Vol. 6, no. 10, pp. 1207-1209 (1994). Such electro-absorption modulators can be co-integrated onto one chip together with laser elements such as the laser 1.

This electro-absorption modulator 2 has the property that light $S_L$ entering it from the laser 1 is attenuated depending on the voltage present at the electrical modulation terminal 21 of the electro-absorption modulator 2, and is output as an outgoing, optical signal $S_{o,T}$ via an optical terminal 22 and coupled into an optical waveguide 3. The electric current $I_R$ flowing through the electrical modulation terminal 21 of the electro-absorption modulator 2 is here approximately proportional to the quantity of light that is removed from the light $S_L$ output by the laser 1 and not forwarded in the transmitted optical signal $S_{o,T}$.

The electro-absorption modulator 2 under discussion here also has the property that an optical reception signal $S_{o,R}$ received by it at the optical terminal 22 arriving from the optical waveguide 3 is partially forwarded to the laser 1, wherein the electro-absorption modulator 2, depending on the received optical reception signal $S_{o,R}$ entering it, generates an electrical reception signal $I_R$, in the present case in the form of a current signal, and retains it at its electrical modulation terminal 21. This current signal $I_R$ is proportional to the light power or light intensity present in the electro-absorption modulator 2. Since the frequency of the light $S_L$ output by the laser 1 is approximately adjusted to that of the optical reception signal $S_{o,R}$, and the difference between the frequencies is smaller than the electro-optical bandwidth of the electro-absorption modulator 2, optically coherent detection of the optical reception signal $S_{o,R}$, results which, in contrast to direct optical detection, without a local optical oscillator in the form of a laser 1, yields the generally known advantages of a higher detection sensitivity and frequency selectivity, i.e. signal filtering takes place during the detection.

A portion, controllable according to a voltage signal, of the received optical reception signal $S_{o,R}$ entering the electro-absorption modulator 2 is directed through the electro-absorption modulator 2 onto the laser 1. It is ensured here in advance through drive and adjustment of the laser current $I_L$ that the light $S_L$ output by the laser 1 has a specified optical frequency that lies close to the optical frequency of the incoming optical reception signal $S_{o,R}$.

The electrical reception signal $I_R$ is forwarded to a control unit 5 that is also designed to apply a specified voltage signal to the electrical modulation terminal 21 of the electro-absorption modulator 2 in order in that way to control the transmissivity of the electro-absorption modulator 2. The control unit 5 is also designed to adjust the laser current $I_L$ in such a way that the light $S_L$ output by the laser 1 has a specified optical frequency.

The control unit 5 comprises a signal terminal 51 via which bidirectional data can also preferably be transmitted. Provided an electrical reception signal $I_R$ is made available by the electro-absorption modulator 2 in the form of a current signal, this current signal is measured by the control unit 5, and a reception signal $S_R$ that corresponds to this current signal $I_R$ is retained at the signal terminal 51 of the control unit 5.

To transmit optical signals $S_{o,T}$ by means of the transmission unit 10 illustrated in FIG. 1, a transmission signal $S_T$ is specified at the signal terminal 51 of the control unit 5, and in the present case is forwarded as an electrical voltage signal to the electrical modulation terminal 21 of the electro-absorption modulator 2.

FIG. 2 shows a spectral, optical frequency diagram of the light $S_L$ of the laser 1 and of the received optical signal $S_{o,R}$ in the initial situation. The frequency $f_L$ of the light $S_L$ in the present exemplary embodiment of the invention will lie within an optical frequency range F of typically ±1 GHz around the optical frequency $f_R$ of the received, optical signal $S_{o,R}$. The frequency $f_L$ of the light $S_L$ of the laser 1 can also be adjusted in such a way that it lies within an optical frequency range F of typically ±1 GHz around a specified optical frequency that is specified for the transmission of the optical reception signal $S_{o,R}$.

Because the reception signal $S_{o,R}$ thus irradiates the laser 1, which has very much the same frequency as the light $S_L$, output by the laser 1, an effect known as "injection locking" results, in which the frequency of light $S_L$, radiated by the ("slave") laser 1 adapts to the optical ("master") frequency of the received, optical signal $S_{o,R}$. The crucial advantage of the method considered here results from this: the coherent optical detection of the optical reception signal $S_{o,R}$ does not occur with approximate adaptation of the optical frequencies of the laser 1 and of the signal $S_{o,R}$, which corresponds to the case of intradyne detection, but with precise adaptation of these frequencies, which corresponds to the case of homodyne detection. In contrast to intradyne detection, which requires an enormous computing effort for the purposes of signal processing and recovery of the information signal, enormous advantages in terms of cost and energy efficiency that otherwise can only be achieved with complex phase locked loops arise with the implementation of a transmission unit 10 as a result of the attractive properties of homodyne detection.

FIG. 3 shows a spectral, optical frequency diagram of the light $S_L$ of the laser 1 and of the received optical signal $S_{o,R}$ after the adaptation of the laser frequency $f_L$ through injection locking. This now has the significant advantage that, due to the equal frequencies of the light $S_L$ the laser 1 and that of the received, optical reception signal $S_{o,R}$, an overlay takes place wherein the signals contained in the received optical reception signal $S_{o,R}$ come to be located precisely in the baseband ("homodyne detection") and can therefore be particularly easily read out, i.e. without additional digital signal processing for the purposes of frequency offset correction, and particularly easily identified in the electrical reception signal $I_R$.

Through the overlay of the light $S_L$ of the laser 1 and of the received, optical reception signal $S_{o,R}$ a current signal is generated that is approximately proportional to the product of the field strengths of the light $S_L$ and of the reception signal $S_{o,R}$. Due to the approximation of the frequency $f_L$ of the laser 1 to the central frequency $f_R$ of the reception signal $S_{o,R}$ the frequency band generated by the reception signal $S_{o,R}$ is represented in a frequency range around 0 Hz, and therefore lands in the electrical baseband (FIG. 4). Depending on the received optical power, the low-frequency components can be suppressed by the injection locking effect. Through suitable sender-side encoding of the reception signal $S_{o,R}$ it is possible to compensate for this, such as through the use of non-return-to-zero encoding, such as, for example, the alternate mark inversion coding method.

The optical frequencies advantageously lie in the range between 150-800 THz. If, for example, red light is used for the data transmission, a typical light frequency $f_L$, $f_R$ of 430 THz is obtained. Fiber-based optical communication makes use of light frequencies around 190 THz in order to be subject to minimal transmission losses. The bandwidth of the signal modulated into the optical signal $S_0$ can—depending on the number of optical carrier frequencies $f_{L1}$, $f_{L2}$, . . . chosen in a parallel manner—be chosen approximately in the range of a few gigahertz, but in the context of broadband information signals can extend into the range of typically 100 GHz.

If a plurality of optical signals $S_{o,1}$, $S_{o,2}$ $S_{o,3}$ with a plurality of carrier frequencies are to be transmitted over a single optical waveguide 3, the carrier frequencies $f_{L,1}=|f_{R,1}-f_L|$ (with $f_L=f_{R,0}$ through injection locking), $f_{L,2}$, $f_{L,3}$ should be spaced far enough apart from one another that the spreading of the respective band caused by the modulation does not lead to crosstalk between the signals. If, for example, a transmission bandwidth of 6 GHz is chosen for the information signal, as is usual with newer mobile radio networks, the individual carrier frequencies—with the use of a safety band from one another and additional modulation technology such as, for example, single-sideband modulation or more complex methods such as, for example, orthogonal frequency multiplexing methods—can then be spaced about 10 GHz apart, as is illustrated in FIG. 5.

It is particularly advantageous during the transmission of data to modulate the light $S_L$ of the laser 1 with electrical signals that are already modulated. Thus for example, a data signal that is to be transmitted via mobile radio, can be modulated onto an electrical carrier frequency in the range of a few gigahertz, typical for mobile radio. The electrical signal modulated in this way is then used as the electrical transmission signal $U_T$ and an optical signal $S_{0,1}$ generated in this way by means of a transmission unit 10 illustrated in FIG. 1, said signal transmitted via an optical waveguide 3 and received by another transmission unit 10, which may in particular also be one illustrated in FIG. 1. After the reception and the demodulation performed in the electro-absorption modulator 2, a corresponding reception signal $I_R$ is present in the electrical transmission signal $U_T$, and comes to be located at precisely the same carrier frequency as was provided for the information signal. It is to be noted that there is no necessity for electrical modulation in the receiving transmission unit 10, since the electrical signal is already present in modulated form. A plurality of these information signals can alternatively be transmitted simultaneously in this connection on correspondingly many closely neighboring carrier frequencies, or these can also be transmitted at lower intermediate frequencies, for example in the frequency band between 0 and 10 GHz, and then transposed to very high carrier frequencies such as for example in the range from 60-80 GHz. The advantage results here that each of the originally selected carrier frequencies is retained, since no frequency offset occurs during the coherent optical detection according to the method.

A variant of the invention is now described below with reference to FIG. 1, with which an incoming optical signal $S_{o,R}$ can be received and on the other hand an optical transmission signal $S_{o,T}$ can be transmitted simultaneously. For the purpose of generating and transmitting the transmission signal $S_{o,T}$, the control unit 5 sets the voltage applied at the electrical modulation terminal 21 of the electro-absorption modulator 2 in accordance with the data contained in the transmission signal $S_T$ to a specified value stipulated by an electrical voltage signal.

Through this measure, the light $S_L$ output by the laser 1 is attenuated in accordance with the electrical transmission signal $U_T$ and emerges from the electro-absorption modulator 2 as the optical transmission signal $S_{o,T}$.

As is also the case in the first exemplary embodiment of the invention, the current $I_R$ drawn by the electro-absorption modulator 2, which arises with the specification of the electrical transmission signal $U_T$ by the electro-absorption modulator 2 as well as from irradiation with the incoming, optical reception signal $S_{o,R}$, is measured.

Because the incoming optical signal $S_{o,R}$ entering at the optical terminal 22 of the electro-absorption modulator 2 nevertheless contains data, a current that deviates from the modelled current curve $I_{R,m}$ arises at the electrical modulation terminal 21 of the electro-absorption modulator 2.

In order to be able to isolate the effects of the optical reception signal $S_{o,R}$ on the current curve $I_R$ and to be able to determine and eliminate the effects of the electrical transmission signal $U_T$ on the current curve, the temporal current curve $I_{R,m}$ that results with a specified irradiation of the electro-absorption modulator 2 by the laser 1 and the specified signal application at the electrical modulation terminal 21 of the electro-absorption modulator 2 when no optical reception signal $S_{o,R}$ is received through the optical waveguide 3, or an optical reception signal $S_{o,R}$ that does not contain a modulated signal is received, is modelled. This can be done through calibration with reference to known optical input and output signals.

The difference $\Delta I$ between the measured current curve $I_R$ and the modelled current curve $I_{R,m}$ is then formed, which can be done through known signal processing algorithms in the digital domain or through high-frequency circuit technology in the analog domain. This difference $\Delta I$ is now assumed to be based on the optical reception signal $S_{o,R}$ and provided as the reception signal $S_R$ or used for the generation of the reception signal $S_R$. It is possible with this measure to calculate out those influences on the current flowing at the electrical modulation terminal 21 of the electro-absorption modulator 2 that arise in the course of the transmission of the transmission signal $S_T$, and in spite of the exposure of the electro-absorption modulator 2 to an electrical transmission signal $U_T$, to generate a reception signal $S_R$ that corresponds to an incoming, optical reception signal $S_{o,R}$. As a result it is also possible to operate the present arrangement in full duplex mode.

It is of course also alternatively possible to operate the transmission unit 10 in the generally known half-duplex mode, so that a transmission signal $S_T$ and a reception signal $S_R$ do not overlap in time. Light with a specified optical frequency $f_R$ is modulated here with a signal to be transmitted in order to generate a modulated optical reception signal $S_{o,R}$. A reception step and a transmission step are then each performed in alternation in sequential time segments.

In the course of the reception step within a first time segment, as described above, an optical reception signal $S_{o,R}$ is received while adjusting the optical frequency $f_L$ of the laser 1 to the specified optical frequency $f_R$ and, as described above, demodulated and converted into an electrical reception signal $I_R$ and further processed by the control unit 5.

In the course of a subsequent transmission step within a subsequent second time segment, light $S_L$ with the same specified optical frequency $f_L$ is output by the laser 1 onto the electro-absorption modulator 2. Further, a transmission signal $S_T$ that is to be transmitted, in particular in the form of an electrical voltage signal, will be at the electrical modulation terminal 21 of the electro-absorption modulator 2. The result of this is that the light passing through the electro-absorption modulator 2 is attenuated corresponding to the transmission signal $S_T$ to be transmitted, and the optical transmission signal $S_{o,T}$ obtained in that way is coupled into the optical waveguide 3 and transmitted.

A further alternative consists in the use of multiplexing in order to appropriately separate the transmission signal $S_T$ and the reception signal $S_R$ in full duplex operation. An attractive example for this would be the commonly used frequency multiplexing, so that transmission and reception signals $S_T$, $S_R$ are transmitted in different electrical frequency ranges, although using the same optical carrier frequency, and crosstalk can be suppressed through filtering.

The signals arising in the context of frequency multiplexing are illustrated in more detail in FIG. 5a and FIG. 5b.

In the context of the frequency multiplexing, an optical, modulated reception signal $S_{o,1}$, during the generation of which a data signal $D_1$ with a specified first electrical frequency $f_1$ is modulated, is supplied to the transmission unit 10. A signal $S_1$ that comprises frequency components within the first frequency range $F_{el,1}$ around the specified electrical frequency $f_{el,1}$ is obtained from this. The signal $S_1$ obtained in this way is then used for modulating light with a specified optical frequency $f_L$. An optical, modulated reception signal $S_{o,R}$ is obtained in this way.

This reception signal $S_{0,1}$ is, as described in connection with the first form of embodiment of the invention, obtained using light $S_L$ with the specified optical frequency $f_L$. An electrical reception signal $I_R$ which comprises frequency components within a specified first electrical frequency range $F_{el,1}$ is obtained here.

Simultaneously with the reception of the data in the first electrical frequency band $F_{el,1}$ data are transmitted in the second electrical frequency band $F_{el,2}$. An electrical transmission signal $U_T$ that comprises signal components within a frequency band $F_{e1,2}$ that differs from the first frequency band $F_{el,1}$, does not overlap with it and is spaced apart from it, is used here. This electrical transmission signal $U_T$ can be generated through the modulation of a data signal $D_2$, wherein the same electrical modulation method can be used as is in the generation of the signal $S_1$.

The electrical transmission signal $U_T$ is applied to the electro-absorption modulator 2. By means of the laser 1, light $S_L$ with the specified optical frequency $f_L$ is output simultaneously to the electro-absorption modulator 2. In this way, the light passing through the electro-absorption modulator 2 is attenuated corresponding to the transmission signal $U_T$ to be transmitted, and the optical transmission signal $S_{o,T}$ obtained in this way is coupled into the optical waveguide 3 and transmitted.

Figure 6:
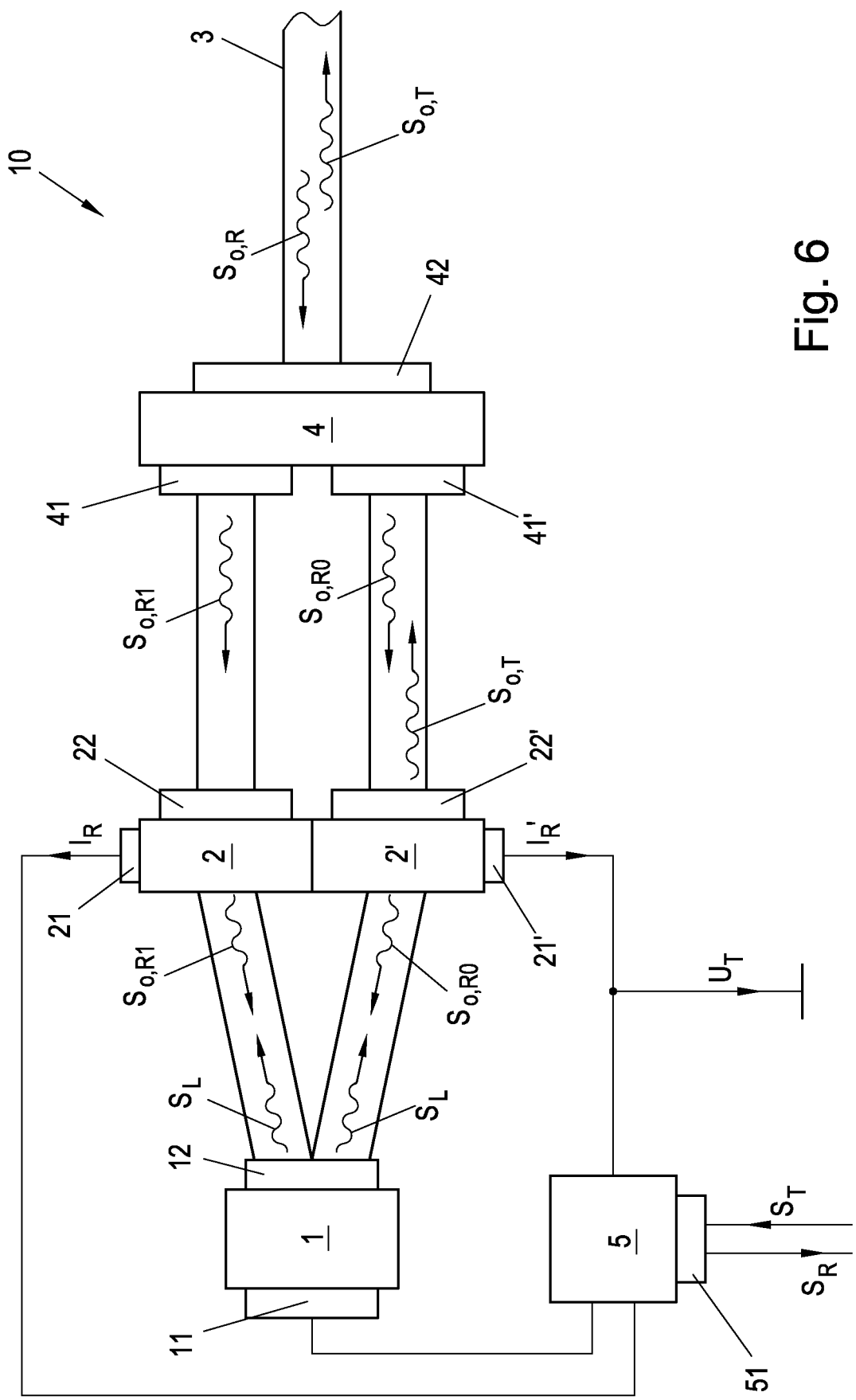
FIG. 6 shows a preferred form of embodiment for taking changing polarization properties of light waves in the optical waveguide into account.

A preferred second form of embodiment of the invention that is preferably adjusted to the polarization of the light passing through the optical waveguide 3 is illustrated in FIG. 6. The significant background to this form of embodiment is that, as a result of physical effects on the optical waveguide 3, in particular as a result of thermal effects or mechanical influences, the polarization of the light $S_{o,R}$, $S_{o,T}$ conveyed via the optical waveguide 3 is subject to temporal variations, and for the case of coherent optical detection that is the object of the invention, the polarization states of local light $S_L$ out of the later 1 and the incoming optical signal $S_{o,R}$ that is to be received are ideally the same. In addition, through the adjustment of the incoming polarization state, the generally polarization-selective properties of the electro-absorption modulators 2, 2' in use can be prevented. In the present second exemplary embodiment of the invention, a laser 1 that has an electrical input 11 and that comprises an optical laser output 12 is connected after the two electro-absorption modulators 2, 2'. The design of the laser 1 or of the electro-absorption modulators 2, 2' preferably corresponds to the design of the laser 1 and the electro-absorption modulator 2 in the first exemplary embodiment of the invention. As is also the case in the first exemplary embodiment of the invention, light $S_L$ generated by the laser 1 is passed on to both electro-absorption modulators 2, 2'. Both electrical modulation terminals 21, 21' of the two electro-absorption modulators 2, 2' are brought to a common control unit 5. The control unit 5, as is also the case in the first exemplary embodiment of the invention, is furthermore connected to the electrical input 11 of the laser 1 that is used for control of the frequency $f_L$ of the light $S_L$.

The two optical terminals 22, 22' of the electro-absorption modulators 2, 2' are connected to the two polarization inputs 41, 41' of a polarization beam splitter 4. The common output 42 of the polarization beam splitter 4 is coupled into the optical waveguide 3. The fundamental functionality of the transmission unit 10 illustrated in FIG. 2 corresponds to that of the transmission unit 10 illustrated in FIG. 1. The two electro-absorption modulators 2, 2' can of course equally well be fed by two separate lasers 1, 1' that are adjusted in accordance with the previously described method of injection locking to the incoming optical frequency $f_R$ of the optical signal $S_{o,R}$ to be received. As a rule, however, use would be made of photonic integration in order to implement the device, as in FIG. 6, with only one laser 1.

In the present case, an important special feature is that the received optical signal $S_{o,R}$ can be received independently of its polarization, wherein an electrical reception signal $I_R$, $I_R'$ is generated by the two electro-absorption modulators 2, 2' depending on the polarization state of the incoming optical reception signal $S_{o,R}$. The magnitude of the electrical reception signal $I_R$ that is present at the electrical modulation terminal 21 of the first electro-absorption modulator 2 depends on how strongly the incoming, optical reception signal $S_{o,R}$ is aligned to the polarization direction of the first polarization input 41 of the polarization beam splitter 4. The magnitude of the electrical reception signal $I_R'$ that is present at the electrical modulation terminal 21' of the second electro-absorption modulator 2' depends on how strongly the incoming, optical reception signal $S_{o,R}$ is aligned to the polarization direction of the second polarization input 41' of the polarization beam splitter 4.

If an optical reception signal $S_{o,R}$ that is essentially polarized in accordance with the first polarization direction now enters, then signal components originating from the signal are largely found in the electrical reception signal $I_R$ that is present at the electrical modulation terminal 21 of the first electro-absorption modulator 2. If on the other hand an optical reception signal $S_{o,R}$ that is essentially polarized in accordance with the second polarization direction enters, then signal components originating from the signal are largely found in the electrical reception signal $I_R'$ that is present at the electrical modulation terminal 21' of the second electro-absorption modulator 2'. Through the use of a polarization beam splitter 4 that passes orthogonal polarization directions to the two electro-absorption modulators 2, 2' it is thus possible, independently of the incoming polarization state of the light, for a signal always to be received which, in the least favorable case, is only attenuated by a known factor of approximately 0.5 from at least one of the electro-absorption modulators.

The control unit 5 subsequently determines which of the two electrical reception signals $I_R$, $I_R'$ is larger or has the greater signal energy or signal strength, and respectively employs the reception signal $I_R$, $I_R'$ with the greater signal energy or signal strength for the generation of the reception signal $S_R$.

In the form of embodiment illustrated in FIG. 6, it is now possible to use one of the two electro-absorption modulators 2, 2' for transmitting signals. If the greater signal strength or signal energy is determined in one of the two electro-absorption modulators 2, 2', then the respective other electro-absorption modulator 2, 2' is employed for transmitting signals. The control unit 5, which has already established in which of the two electro-absorption modulators 2, 2' the greater signal strength or signal energy is present, selects whichever of the electro-absorption modulators 2, 2' from which the weaker signal energy or signal strength is coming at the time for transmission of the transmission signal to be transmitted $S_T$, and applies an electrical transmission signal $U_T$ that corresponds to the transmission signal $S_T$ to the electrical modulation terminal 21, 21' of this electro-absorption modulator 2, 2'. On the basis of this electrical transmission signal $U_T$ the electro-absorption modulator 2, 2' concerned is made to generate an optical transmission signal $S_{o,T}$ that is coupled into one of the two polarization inputs 41, 41' of the polarization beam splitter 4, and is accordingly present at the output 42 of the polarization beam splitter 4 and coupled into the optical waveguide 3.

In accordance with the previously described function of the device, it is of course also possible to operate both electro-absorption modulators 2, 2' in transmitter function or in receiver function, or to change the functions of the electro-absorption modulators 2, 2' over time. It is as a result possible to adjust the data rate flexibly to the particular situation with reference to the required data throughput. In the event that both electro-absorption modulators 2, 2' are operated in receiving function, it is also possible for the generally known polarization multiplexing to be used in order to increase the data throughput.

Figure 7:
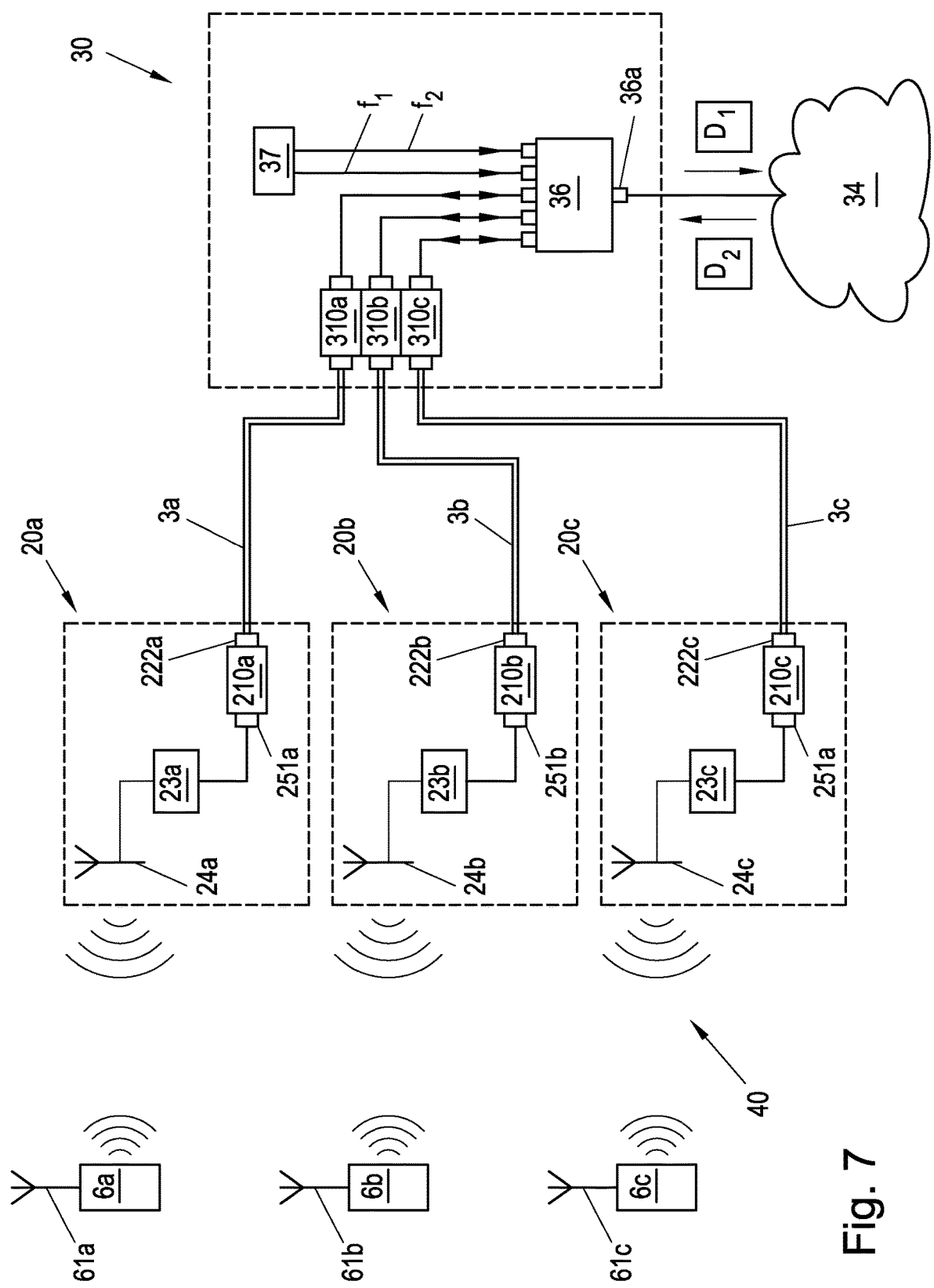
FIG. 7 here shows an overview of the data transmission network for mobile radio.
Figure 8:
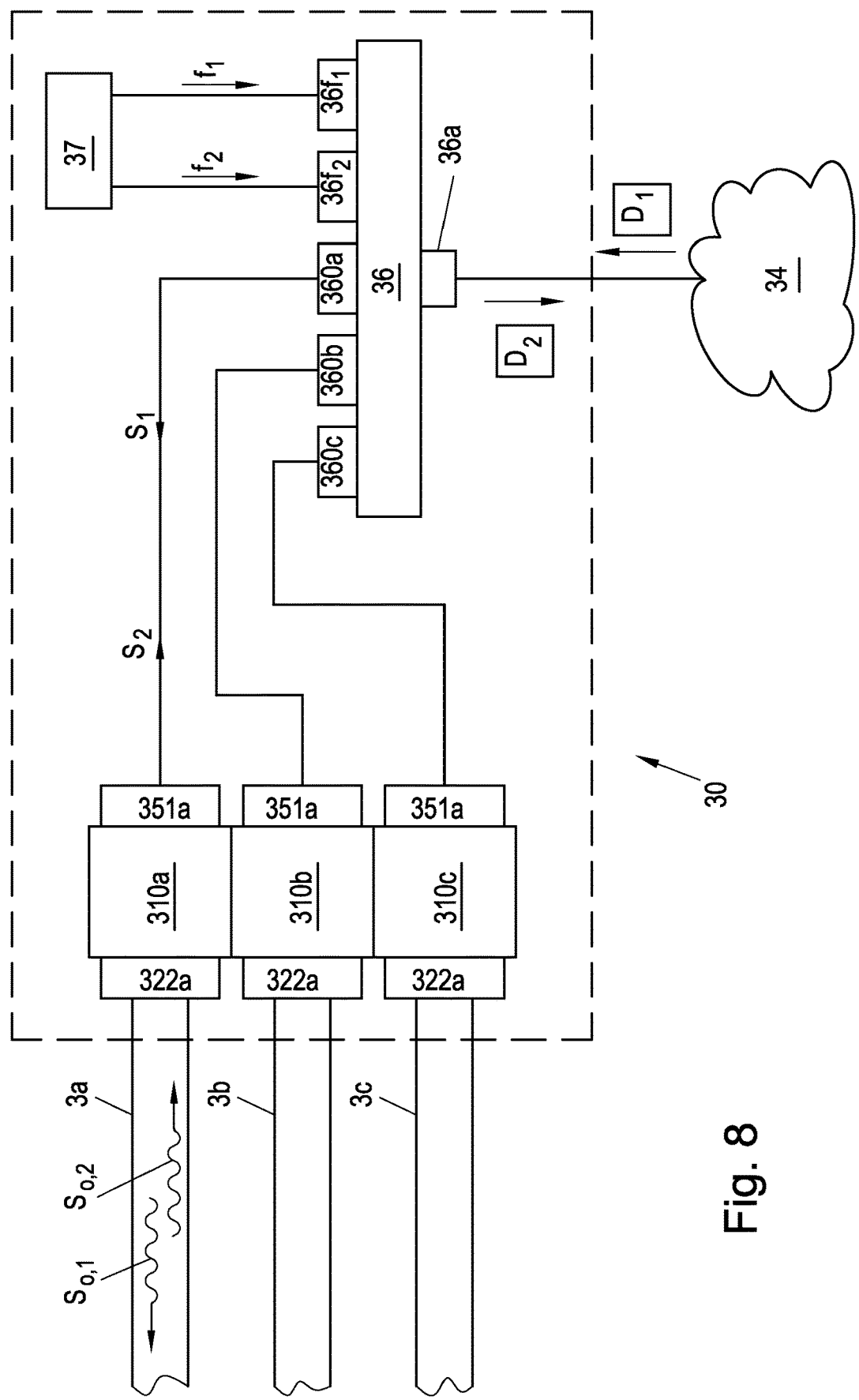
FIG. 8 shows in detail a central node of the data transmission network illustrated in FIG. 7.
Figure 9:
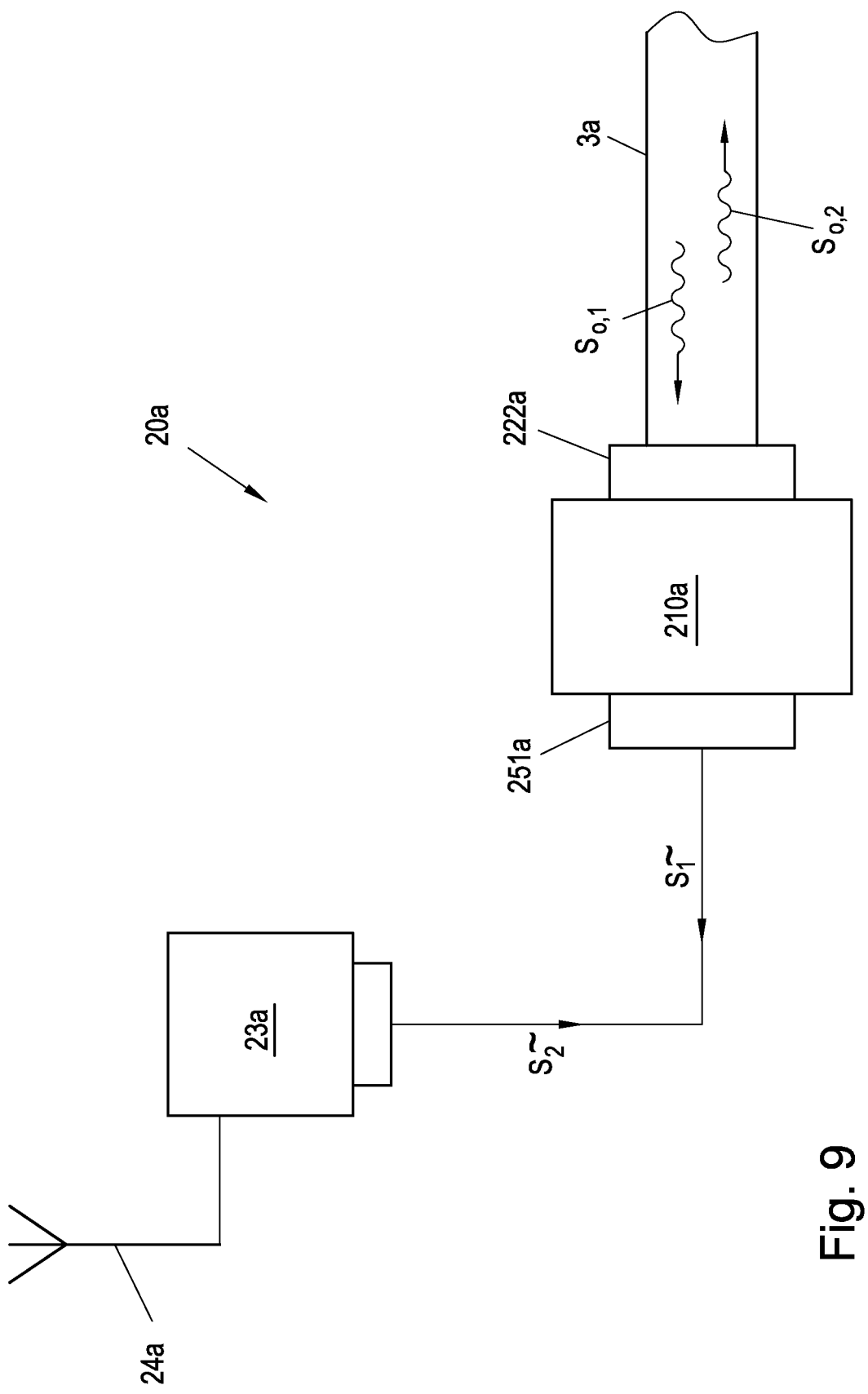
FIG. 9 shows in detail an antenna node of the data transmission network illustrated in FIG. 7.

A further preferred form of embodiment of the invention that permits use in mobile radio is illustrated in more detail in FIGS. 7 to 9. FIG. 7 here shows an overview of the data transmission network 40 for mobile radio. With such a form of embodiment, a method for the transmission of signals from a central node 30 to an antenna node 20a, 20b, 20c equipped with a mobile radio antenna 24a, 24b, 24c and arranged remotely from the central node 30 is provided. In the context of mobile radio, it is a fundamental task to bring a remotely disposed mobile radio device 6a, 6b, 6c that has a respective transmission and reception antenna 61a, 61b, 61c into data communication with a data network 34. This can for example take place for the transmission of speech or of data.

What data is passed from the network 34 to the individual mobile radio devices 6a, 6b, 6c is only of low significance, since in the final analysis the data transmission takes place in most cases in the form of a modulated signal. The data transmission from a network 34 to a mobile radio device 6a, 6b, 6c and the data transmission from a mobile radio device 6a, 6b, 6c to the data transmission network 34 will first now be described in more detail below.

Data $D_1$ is first transmitted from the data transmission network 34 to the central node 30 (FIG. 8). The data $D_1$ is received in the central node 30 by a data relaying unit 36, wherein the data $D_1$ is transmitted to a data terminal 36a, 36b, 36c of the data relaying unit 36. The central node 30 has an oscillator 37 that sends different frequency signals $f_1$, $f_2$, each with a different frequency, to the relaying unit 36. These frequency signals $f_1$, $f_2$ reach the frequency inputs 36$f_1$, 36$f_2$ provided for the purpose at the relaying unit 36. An oscillator 37 of this sort generates a frequency signal whose frequency is very stable over time and that is not subject to frequency variations for the data transmission. Since the generation of such a frequency signal is very temperature-dependent, the provision of a stable oscillator 37 is only possible with a large effort and at high cost.

It is accordingly advantageous that such an oscillator 37 is located in the central node 30, and not in the antenna nodes 20a, 20b, 20c that are in connection with the central node 30 but that are arranged remotely. Precisely when one central node 30 is in data communication with a large number of antenna nodes 20a, 20b, 20c it is advantageous if only one single central oscillator 37 is used. This can, in particular, be arranged in a climate-controlled server room, in order to avoid variations. Equally, to save costs as a result of this consolidation of technological functions in one central node 30, a centralized oscillator 37 of higher quality can be employed.

If, as will yet be shown, no oscillators 37 are required in the region of the antenna nodes, then the necessity of making corresponding climate-conditioning available at individual mobile radio locations or antenna nodes 20a, 20b, 20c for the production of an oscillator 37 is obviated, whereby high cost-savings can be achieved.

The individual frequency signals $f_1$, $f_2$ generated by the oscillator 37 are sent to the data relaying unit 36. This, depending on the frequency required for the mobile radio and on the receiver data given in the data package $D_1$, determines the frequency that is needed for the transmission to the receiver, as well as the particular antenna nodes 20a, 20b, 20c or the mobile radio location at which the receiver of the relevant data signal $D_1$ can be reached.

In the present case the data relaying unit 36 selects the frequency signal $f_2$ for modulation of the data signal $D_1$ and transmits this data via the modulation terminal 360a to a central transmission unit 310a. The data relaying unit 36 furthermore comprises two further central transmission units 310a, 310b, 310c each of which is connected to a terminal 360a, 360b, 360c of the data relaying unit 36. In the present exemplary embodiment, the signals that are output from the data relaying unit 36 via the modulation terminals 360a, 360b, 360c to the central transmission units 310a, 310b, 310c are electrical signals $S_1$, $S_2$. In the present case these are generated by the data relaying unit 36, in that the specified data signal $D_1$ is modulated with a specified frequency $f_2$. The specified frequency $f_2$ corresponds in the present case to the frequency with which the signal is finally radiated from the mobile radio antenna 24a of the antenna node 20a, and which should be transmitted to the mobile radio device 6a stipulated for the reception. A modulated transmission signal $S_1$ is generated for this purpose by the data relaying unit 36 and is transmitted to the signal terminal 351a of the first central transmission unit 310a. In the present exemplary embodiment, the central transmission unit 310a corresponds to the transmission unit 10 illustrated in FIG. 1. The two other central transmission units 310b, 310c also correspond to the transmission unit illustrated in FIG. 1.

On the basis of the signal $S_1$ generated by the data relaying unit 36, the first central transmission unit 310a generates a modulated, optical transmission signal $S_{o,1}$ at its optical terminal 322a that is transmitted via an optical waveguide 3a to the antenna node 20a. This means that an analog-optical transmission of the signal $S_1$ takes place.

The antenna node 20a is illustrated in more detail in FIG. 9; the illustration shows in particular that the optical transmission signal $S_{0,1}$ that has just been described is transmitted via the optical waveguide 3a to the antenna node 20a. The antenna node 20a comprises a transmission unit 210a with an optical terminal 222a into which the optical waveguide 3a is coupled, and via which the modulated optical signal $S_{0,1}$ reaches the transmission unit 210a. The transmission unit 210a corresponds largely to the transmission unit 10 illustrated in FIG. 1, and at its signal terminal 251a makes a signal $S_1\tilde{}$ available that is passed on to an antenna amplifier 23a and radiated out from a mobile radio antenna 24a. The radiated signal is received, demodulated and processed by the mobile radio device 6a via the antenna 61a.

Because the optical signal $S_{0,1}$ has already been modulated with a modulated electrical signal $S_1$, which means that the information signal is already located in modulated form at an electrical carrier frequency, an electrical, modulated reception signal $I_R$ (FIG. 1), or a modulated reception signal $S_1^\sim$ is obtained in the antenna node 20a after the optical demodulation in the electro-absorption modulator 2 at the signal terminal 251a of the transmission unit 210a.

Because this signal is already present in modulated form, a separate oscillator 37 is not provided. Rather it is possible for the signal $S_1$ that was already previously modulated in the central node 30, that was also converted in the central node 30 into an optical signal $S_{o,1}$, to be converted again in the antenna node 20a into an electrical signal $S_1^\sim$ that is passed on further to the mobile radio antenna 24a for radiation. A digital-analog converter, which would be necessary in the case of digital-optical transmission, is also unnecessary for converting the signal $S_1$ into a signal $S_1^\sim$ suitable for mobile radio.

How a signal radiated from a mobile radio device 6a by way of its antenna 61a is received by an antenna node 20a and conveyed via the central node 30 to the data network 34 will now be explained below. The signal reaching the mobile radio antenna 24a is amplified in the amplifier 23a and passed as the transmission signal $S_2^\sim$ to the signal terminal 251a of the transmission unit 210a. On the basis of the transmission signal $S_2^\sim$, the transmission unit 210a generates a signal $S_{o,2}$ at its optical terminal 22a which is passed via the optical waveguide 3a to the central node 30. As already explained, the optical waveguide 3a is connected in the central node 30 to the optical terminal 322a of the first central transmission unit 310a. At the signal terminal 351a of the first central transmission unit 310a of the central node 30, a signal $S_2$, in the present case a modulated, electrical signal $S_2$, is present, which is taken to the first modulation terminal 360a of the data relaying unit 36. The data relaying unit 36 demodulates the signal $S_2$ present at the first modulation terminal 360a using the second frequency $f_2$ generated by the oscillator 37 which is present at the frequency terminal 36$f_2$ of the data relaying unit 36. The data signal $S_2$ generated on the basis of the demodulation of the signal $S_2$ is retained at the output of the data relaying unit 36, and transmitted to the data network 34 as the data signal $D_2$.

It is again not necessary for an oscillator 37 to be located in the antenna node 20a, 20b, 20c for the transmission of modulated signals from the mobile radio device 6a, 6b, 6c into the data network 34. The mobile radio device 6a has an oscillator 37, and transmits electromagnetic signals with a specified frequency to the mobile radio antenna 24a. The signal received in this way is then amplified in the amplifier 23a and converted by the mobile radio transmission and reception device 210a into an optical signal $S_{o,2}$. It is not necessary for the signal $S_2^\sim$ received from the mobile radio device 6a, 6b, 6c to be demodulated at all in the antenna node 20a, 20b, 20c. Rather the received signal is simply converted into an optical signal $S_{o,2}$ and transmitted to the central node 30 for further processing.

This method for the analog transmission of modulated mobile radio signals via optical waveguides 3 assumes that the modulation or reception bandwidth of the transmission units 210, 310 is larger than the electrical carrier frequency of the modulated mobile radio signals $S_1$, $S_1^\sim$, $S_2$, $S_2^\sim$. For the special case in which very high carrier frequencies beyond the typical electro-optical bandwidths of electro-absorption modulators 2 are used, such as is considered in new mobile radio standards such as, for example, 5G, the transmission of the mobile radio signals can now take place in modulated form at an "intermediate" frequency as described above. A subsequent frequency conversion of the signals $S_1$, $S_1^\sim$, $S_2$, $S_2^\sim$ by frequency mixing with a pre-defined frequency originating from a local electrical oscillator 37 can then transpose the received, modulated signal $S_1$, $S_1^\sim$, $S_2$, $S_2^\sim$ to the desired high carrier frequency. Such a frequency conversion is generally known, and also in use for such purposes.

Figure 10:
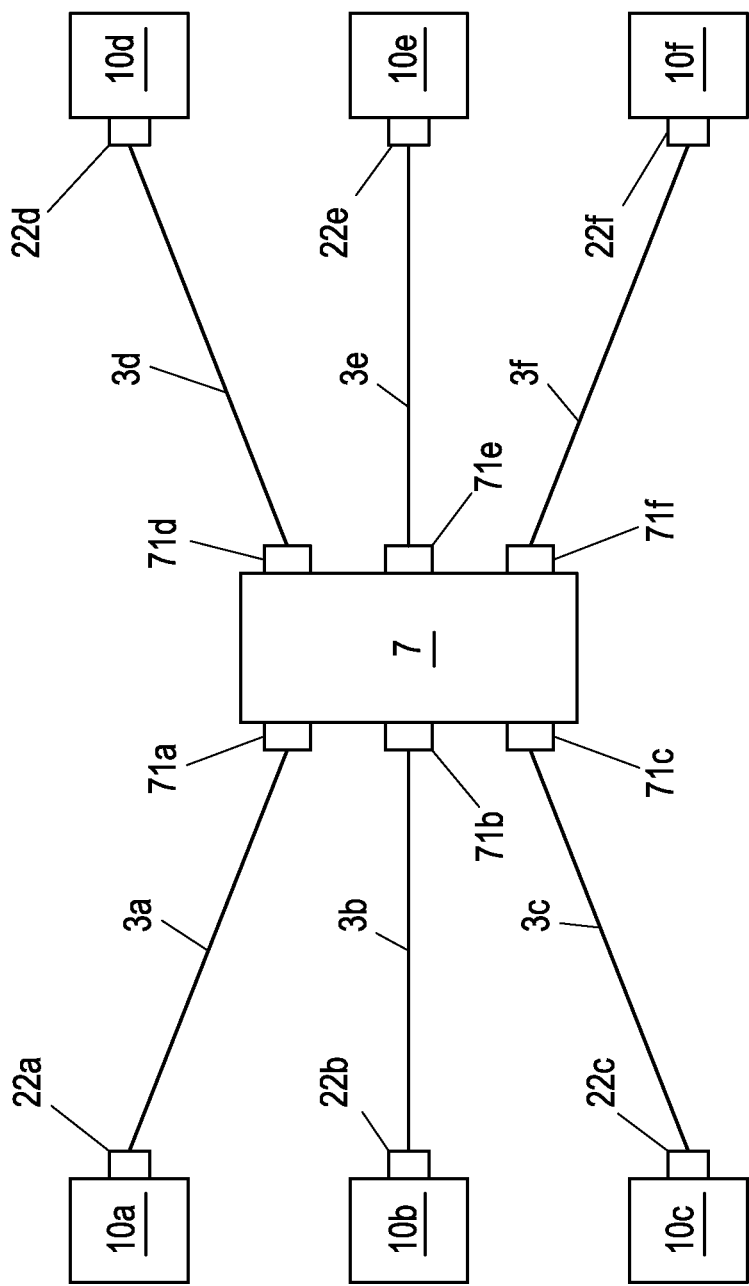
FIG. 10 shows a data transmission network according to a preferred form of embodiment of the invention.

A further form of embodiment of the invention with which a large number of transmission units 10a, . . . , 10f can be coupled to one another in a data exchange network 70 is illustrated in FIG. 10. This comprises a large number of transmission units 10a, . . . , 10f according to the invention, each of which is coupled via an optical waveguide 3a, . . . , 3f into a central optical interface 7. A respective optical waveguide 3a, . . . , 3f is provided here, each of which is coupled into a terminal 22a, . . . , 22f of a transmission unit 10a, . . . , 10f and a terminal 71a, . . . , 71f of the central interface 7.

The central optical interface 7 can, in the simplest embodiment, be a passive optical coupler in an N×N configuration, where N is the number of terminals at the bidirectional input and output of this passive power divider. In the case of FIG. 10, N would be equal to 3. An internal feedback coupling to the coupler terminals of the central optical interface can also take place in order to transfer signals artificially again to the same side of the coupler. It may thus be possible that transmission units 10a, 10b, 10c can also communicate with one another.

In the present data exchange network 70, it is possible, in an easy manner, for some of the transmission units 10a, . . . , 10f illustrated here to enter into data connection with one another, that they agree a common optical transmission and reception frequency, wherein, in particular, a transmission and reception frequency is assigned to each transmission unit 10a, . . . , 10f on which they can be addressed. If a transmission unit 10e now, for example, wants to enter into data communication with another transmission unit 10a, it can, for example, set the frequency of its laser 1e to a frequency that corresponds essentially to the optical frequency of the laser 1a of the transmission unit 10a, and accordingly transmit data to the transmission unit 10a.

In order here to ensure an advantageous data communication, it can also be provided that all the transmission and reception frequencies that are assigned to the individual transmission units 10a, . . . , 10f are known to all the other transmission units 10a, . . . , 10f and are stored in them. As a response, the transmission unit 10a can for example, while retaining its own transmission frequency, send a response back to the transmission unit 10e that is initiating the communication.

The other transmission units can here also set their lasers 1b, 1c, 1d, 1f to the frequency of the first transmission unit 10a, read all communication between the transmitting and receiving devices 10a, 10e, which means that information can be exchanged in a point-to-multipoint method. It is possible that further messages can be transmitted to these two transmission units 10a, 10e.

In addition to this it is also, however, possible for example that in parallel with communication between the transmission units 10a, 10e the transmission units 10b, 10d also enter into data communication with one another and select a different optical transmission and reception frequency. The selection of the individual optical transmission and reception frequencies in order to avoid crosstalk can be chosen as illustrated in FIG. 5.

A frequency for taking up communication with transmission unit 10d that corresponds to the frequency assigned to the transmission unit 10d can for example be chosen here by the transmission unit 10b. It is possible in this case that the transmission units 10*a*, 10*e* and the transmission units 10*b*, 10*d* enter into data communication with one another without interfering with the respective other transmission units 10*a*, . . . , 10*f*.

Transmission frequencies can be stipulated electrically, but also optically. While a plurality of electrical carrier frequencies can be defined on one optical frequency in accordance with the frequency multiplex scheme, it is equally possible for a plurality of optical frequencies to be used through tuning the emission wavelength of the laser 1, which can be achieved at lasers 1 in general through the laser current $I_L$ or the temperature. The possibility is thus in general already given of implementing a large number of possible transmission channels. The recognition of the channel to be selected can take place through characteristic pilot tones that, on the basis of a definition of the respective optical frequency, said definition being known to, specified in a fixed manner and stored in every transmission unit, are applied, for example at very low frequencies in the kilohertz range. Electrical frequency-multiplexing is particularly suitable here for signals that have already been modulated, while exclusively optical frequencies are in particular appropriate for the transmission of the information signal in the baseband, that is to say without previous electrical modulation onto an electrical carrier frequency.

The invention claimed is:

1. A method for receiving a modulated optical reception signal, the method comprising:
    providing a transmission unit with a laser having an electrical input for control of a laser current and of a frequency of light output by the laser, and an optical laser output, and an electro-absorption modulator following the optical laser output and having an electrical modulation terminal;
    directing the laser at the electro-absorption modulator, and guiding the light of the laser through the electro-absorption modulator and coupling into an optical waveguide at an optical terminal of the electro-absorption modulator;
    directing the optical reception signal, having an optical frequency within a specified optical frequency range, via the optical waveguide through the electro-absorption modulator onto the laser;
    presetting the laser by driving the electrical input to a specified optical frequency that lies within a given optical frequency range of the optical frequency of the received optical reception signal;
    due to an irradiation of the optical reception signal onto the laser, causing the optical frequency of the light radiated by the laser to adapt to the optical frequency of the received optical reception signal and/or adjusting the light radiated by the laser thereto;
    overlaying the light radiated by the laser and the optical reception signal received via the optical waveguide in the electro-absorption modulator, to convert an overlay signal thus generated by the electro-absorption modulator into an electrical reception signal; and
    rendering available a reception signal that corresponds to the electrical reception signal or is derived therefrom, and retaining the reception signal at a signal terminal.

2. The method according to claim 1, wherein:
    the modulated optical reception signal is an amplitude-modulated, optical reception signal generated through the modulation of light of the laser;
    the specified optical frequency at the electrical input lies within +/−1 GHz around the optical frequency of the received optical reception signal;
    the overlay signal is generated by the electro-absorption modulator into an electrical current signal that corresponds to the current curve at the electrical modulation terminal of the electro-absorption modulator; and
    the reception signal at the signal terminal is a current or voltage signal.

3. The method according to claim 1 for a simultaneous transmission and reception of optical signals, the method comprising:
    a) providing a transmission signal to be transmitted as an electrical transmission signal;
    b) applying the electrical transmission signal in form of a voltage signal to the modulation terminal of the electro-absorption modulator during a reception according to claim 1, and coupling the optical transmission signal produced by the modulation of the light generated by the laser into the optical waveguide;
    c) ascertaining a current drawn by the electro-absorption modulator and in that way generating a current signal that is drawn by the electro-absorption modulator when the electrical transmission signal is specified;
    d) based on specified criteria, modeling a temporal current curve that, in the presence of a specified irradiation of the electro-absorption modulator by the light of the laser and a specified signal application with the electrical transmission signal at the electrical modulation terminal of the electro-absorption modulator, when no optical reception signal is received via the optical waveguide or when an optical reception signal is received that does not contain a modulated signal, and retaining the current curve as the modeled current curve;
    e) forming a difference between the current curve measured in step c) and the current curve modeled in step d); and
    f) assuming that the difference results from the optical reception signal and providing same as the reception signal.

4. The method according to claim 1, which comprises:
    additionally directing the light of the laser to a further electro-absorption modulator;
    connecting each of the optical terminals of the two electro-absorption modulators to one of the two polarization inputs of a polarization beam splitter, and coupling the output of the polarization beam splitter to the optical waveguide;
    ascertaining an electrical reception signal by each of the two electro-absorption modulators, and retaining the electrical reception signal with a higher signal strength as the reception signal.

5. The method according to claim 4 for a simultaneous transmission and reception of optical signals, the method further comprising:
    employing the electro-absorption modulator at which a respectively weaker electrical reception signal for transmitting the optical transmission signal; and
    applying the transmission signal to be transmitted in the form of an electrical voltage signal to the modulation terminal of the respective electro-absorption modulator at which the respectively weaker electrical reception signal is ascertained.

6. The method for receiving and transmitting modulated optical signals according to claim 2, wherein, to generate a modulated optical reception signal, light with a specified optical frequency is modulated with a signal o be transmitted, and wherein, in alternating sequential time segments:

signals generated by the method according to claim 1 are received, wherein the optical frequency of the laser is adjusted to the specified optical frequency; and subsequently, in a respectively following time segment, light with the same specified optical frequency is output by the laser onto the electro-absorption modulator, and a transmission signal to be transmitted, is specified at the electrical modulation terminal of the electro-absorption modulator, so that the light passing through the electro-absorption modulator is attenuated in accordance with the transmission signal to be transmitted, and the optical transmission signal obtained thereby is coupled into the optical waveguide and transmitted.

7. The method for the reception and transmission of modulated optical signals according to claim 2, wherein:

to generate the reception signal, a data signal is modulated with a specified first electrical frequency, so that the data signal has frequency components within a first frequency range around the specified electrical frequency, and the signal obtained thereby is used subsequently for the modulation of light with a specified optical frequency and that a modulated optical reception signal is obtained in that way;

the reception signal according to claim 1 is obtained making use of light having the specified optical frequency, and an electrical reception signal is obtained thereby that comprises frequency components within a specified first electrical frequency range; and at the same time, an electrical transmission signal that comprises signal components within an electrical frequency band different from, and not overlapping, the first frequency band is applied to the electro-absorption modulator, and light with the specified optical frequency is output by way of the laser to the electro-absorption modulator;

so that light passing through the electro-absorption modulator is attenuated corresponding to the transmission signal to be transmitted, and the optical transmission signal obtained thereby is coupled into the optical waveguide and transmitted.

8. A method for transmitting signals from a central node to an antenna node equipped with an antenna and located remotely from the central node, the method comprising:

providing a data signal at the central node and modulating the data signal with at least one frequency specified by an oscillator to thereby generate a modulated electrical signal;

providing a modulated optical signal by a central transmission unit on a basis of the modulated electrical signal, and coupling the modulate optical signal into an optical waveguide and transmitting to the antenna node;

generating in the antenna node, on a basis of the optical signal and in accordance with claim 2, a reception signal ascertained by an antenna-side transmission unit, and providing the reception signal at a signal terminal of the antenna-side transmission unit; and transmitting the reception signal, amplified if appropriate, to the antenna of the antenna node and radiating out from the antenna node.

9. The method according to claim 8, wherein:

modulated, electromagnetic signals, being mobile radio signals, entering from the antenna of the antenna node are received and, amplified if appropriate, forwarded to the signal terminal of the antenna-side transmission unit of the antenna node, and from the antenna-side transmission unit an optical signal is generated by the method according to claim 2 and transmitted via the optical waveguide to the central node;

the optical signal is received in the central node and converted by the central transmission unit into an electrical signal;

the electrical signal is demodulated making use of a frequency specified by an oscillator and that the data signal, demodulated in this way, is retained in the central node and, if appropriate, transmitted on via a data network.

10. A transmission unit, comprising:

a laser with an electrical input and an optical laser output;

at least one electro-absorption modulator disposed downstream of said optical laser output of said laser, said electro-absorption modulator having an electrical modulation terminal and an optical terminal for optically coupling said electro-absorption modulator to an optical waveguide;

wherein said laser is directed onto said optical terminal of said electro-absorption modulator and positioned such that light of said laser emerges from said electro-absorption modulator at said optical terminal, and that light impinging on said electro-absorption modulator from said optical terminal is directed at said laser;

wherein the electro-absorption modulator is configured to overlay light radiated by said laser and an optical reception signal entering at said optical terminal, and to retain an electrical reception signal at said electrical modulation terminal that corresponds to an overlay signal of the light radiated by said laser and the optical reception signal; and a control unit connected to said electrical input of said laser and to said electrical modulation terminal of said electro-absorption modulator, said control unit having an electrical signal terminal, and said control unit being configured:

to specify a laser current and a frequency of the light output by said laser via said electrical input of said laser to a value within an optical frequency range around a wavelength of the light carried in said optical waveguide, or around an optical frequency of the optical reception signal; and to analyze the electrical reception signal at said electrical modulation terminal of said electro-absorption modulator and to thereby retain a reception signal corresponding to the optical reception signal entering at said optical terminal.

11. The transmission unit according to claim 10 configured for simultaneously transmitting and receiving optical signals, wherein said control unit is configured:

to generate, on a basis of a transmission signal to be transmitted and applied to said signal terminal, as an electrical transmission signal during a reception of signals to apply to said modulation terminal of said electro-absorption modulator;

to ascertain a current drawn by said electro-absorption modulator and in that way to generate a current signal;

based on specified criteria, to model a temporal current curve that, in a presence of a specified irradiation of said electro-absorption modulator by the light of said laser and a specified signal application at said electrical modulation terminal of said electro-absorption modulator, when no optical reception signal enters via said optical waveguide or when an optical reception signal enters that does not contain a modulated signal, and to retain the current curve as a modeled current curve; and to form a difference between the measured current curve and the modeled current curve, and render the difference, or a signal curve derived therefrom, available as a reception signal.

12. The transmission unit according to claim 10, wherein:
wherein said electro-absorption modulator is one of two electro-absorption modulator onto which the light of said laser is directed;
said optical terminal of each of said two electro-absorption modulators is connected to a respective one of two polarization inputs of a polarization beam splitter, and an output of said polarization beam splitter is coupled to said optical waveguide;
said two electro-absorption modulators are configured to ascertain an electrical reception signal at said electrical modulation terminals; and
said control unit is configured to retain whichever electrical reception signal has a greater signal strength at said signal terminal as the reception signal.

13. The transmission unit according to claim 12, configured for simultaneously transmitting and receiving electrical signals, wherein said control unit is configured to select whichever electro-absorption modulator at which a respectively weaker electrical reception signal has been ascertained for transmitting the optical transmission signal, wherein the transmission signal to be transmitted, in the form of an electrical voltage signal, is applied to said modulation terminal of the respective said electro-absorption modulator at which the respectively weaker electrical reception signal has been ascertained.

14. A central node, comprising:
a data relaying unit with at least one data terminal for connection to a data network, at least one modulation terminal and at least one frequency input;
an oscillator connected to said frequency input, said oscillator being configured to generate frequency signals in accordance with specified criteria and to transmit the frequency signals to said frequency input; and
at least one transmission unit according to claim 10, being a central transmission unit having the signal terminal connected to a modulation terminal of the data relaying unit, and an optical waveguide coupled into the optical terminal of said central transmission unit;
said data relaying unit being configured:
to modulate a data signal entering via the data network at the data terminal onto at least one frequency signal transmitted by the oscillator at the frequency input according to a specified modulation method, and to make the data signal available as a modulated transmission signal at the modulation terminal and, in accordance with specified criteria, to transmit the modulated transmission signal to said central transmission unit; and
to demodulate a reception signal entering via the modulation terminal from said central transmission unit in accordance with a specified demodulation method by way of a frequency signal specified by the oscillator, and to make signal available as a demodulated data signal at the first electrical data terminal and to forward the demodulated data signal to the data network.

15. The central node according to claim 14, wherein said central transmission unit is configured:
to generate light by way of a laser and to direct the light at an electro-absorption modulator to thereby provide a transmission signal entering at a signal terminal of the central transmission unit from said data relaying unit as a modulated optical transmission signal at the optical terminal, to couple the transmission signal into the optical waveguide and to transmit the transmission signal to an antenna node; and
to make available an optical reception signal, received from an antenna node via the optical waveguide at the optical terminal, as a reception signal at the signal terminal and to transmit the reception signal to the data relaying unit.

16. An antenna node for a wireless transmission of data to a mobile radio device having an antenna, the antenna node comprising:
a mobile radio antenna configured to enter into a radio connection with the mobile radio device;
at least one antenna-side transmission unit according to claim 10 having an optical terminal and having a signal terminal connected to the antenna of the mobile radio device; and
an optical waveguide connected to the optical terminal of the antenna-side transmission unit.

17. The antenna node according to claim 16, wherein said antenna-side transmission unit is configured to generate light by way of a laser and to direct the light onto an electro-absorption modulator and thereby
to provide a signal entering at a signal terminal thereof from an amplifier as a modulated optical signal at the optical terminal, to couple the signal into the optical waveguide, and to transmit the signal to a central node; and
to make available an optical signal entering via the optical waveguide at the optical terminal from a central node, as a transmission signal at the signal terminal, and to transmit the transmission signal via a bidirectional amplifier to the mobile radio antenna.

18. The antenna node according to claim 16, further comprising a bidirectional amplifier connected at said mobile radio antenna,
wherein said bidirectional amplifier is connected to the signal terminal of said antenna-side transmission unit and is configured:
to amplify data accepted by said mobile radio antenna and to forward the data as an electrical reception signal to the signal terminal of said antenna-side transmission unit; and
to amplify signals provided at a signal terminal thereof by said antenna-side transmission unit and to forward the signals to said mobile radio antenna for transmission.

19. A data transmission network, comprising:
a central node according to claim 14;
a multiplicity of antenna nodes according to claim 16;
an optical waveguide connecting a respective optical terminal of the antenna-side transmission unit of said antenna nodes and an optical terminal of the central transmission units of said central node to one another;
and, optionally, wherein at least one mobile radio device is in radio connection with the mobile radio antenna.

20. A data exchange network for data transmission, comprising:
a central interface with terminals; and
a plurality of transmission units according to claim 10, wherein each optical terminal of individual said transmission units is respectively connected to a terminal of said central interface by way of an optical waveguide;
wherein said central interface is configured to distribute optical signals via one of the optical waveguides and forward the signals to others of the plurality of transmission units;

wherein at least one transmitting and receiving frequency is assigned to each transmission unit, and wherein said transmission units assigned to each of the transmitting and receiving frequencies are stored in a respective control unit of each of said transmission units; and wherein the control units of said transmission units are configured, on occasion of data transmission, to set, by driving a respective electrical input, the respective laser to an optical frequency within an optical frequency range around the optical frequency of the transmission unit selected for the reception.

\* \* \* \* \*